US006894950B1

United States Patent
Barden et al.

(10) Patent No.: US 6,894,950 B1
(45) Date of Patent: May 17, 2005

(54) UNDERWATER VEHICLE THERMAL BOUNDARY DETECTION SYSTEM

(75) Inventors: Robert J. Barden, Portsmouth, RI (US); William B. Grailich, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/923,257

(22) Filed: Aug. 2, 2001

(51) Int. Cl.[7] .............................. G01S 3/80; G01S 15/66
(52) U.S. Cl. ........................ 367/131; 367/124; 367/96
(58) Field of Search ........................ 367/87, 88, 131, 367/902, 124, 96; 73/170.33

(56) References Cited

U.S. PATENT DOCUMENTS 4,974,213 A * 11/1990 Siwecki ..................... 367/88
5,206,640 A * 4/1993 Hirvonen et al. ........... 340/852
5,214,617 A * 5/1993 Rouquette ................. 367/124

FOREIGN PATENT DOCUMENTS

JP         01124730 A * 5/1989

* cited by examiner

Primary Examiner—Ian J. Lobo
(74) Attorney, Agent, or Firm—James M. Kasischke; Michael F. Oglo; Jean-Paul A. Nasser

(57) ABSTRACT

A thermal sensor system is provided in combination with a maneuverable vehicle, particularly in an underwater application. The system includes a transport pipe having an intake and output for the passage of seawater. A thermal sensor is connected to the transport pipe for detecting an actual temperature of seawater within the transport pipe. Sensor electronics are provided in connection with the thermal sensor, the sensor electronics conditioning signals output by the thermal sensor. The selective sampling by the thermal sensor may either be intermittent or continuous according to system needs. Further, a control device is connected to the sensor electronics, acoustic equipment and a depth sensor in connection with the maneuverable vehicle allowing change of the vehicle's course in response to these inputs.

14 Claims, 2 Drawing Sheets

UNDERWATER VEHICLE THERMAL BOUNDARY DETECTION SYSTEM

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

Not applicable.

BACKGROUND OF THE INVENTION (1) Field of the Invention

This invention generally relates to a device for thermal detection of seawater. More particularly, the invention relates to a device for thermal detection of seawater from within an unmanned underwater vehicle, thereby determining a position of a thermal boundary with respect to the vehicle.

(2) Description of the Prior Art

The current art for presetting underwater vehicles in search of a target is complicated by the presence of thermal layers beneath the water surface. A thermal layer can serve as an acoustic barrier by refracting transmitted sound waves (sonar) thereby isolating the target from the pursuing vehicle. The vehicle operator will thus attempt to position the vehicle by presetting the vehicle at the same depth as the submarine or at least on the same side of the thermal layer as its target to optimize its chance of achieving acoustic detection.

FIG. 1 illustrates the known characteristics of a thermal layer 10 in an underwater environment. Specifically, a vehicle 12 may be on a first side 11 of the thermal layer 10, while the target 14 is on an opposite side 11' of the same thermal layer 10. This figure clearly shows how a target 14 can avoid detection by a sonar signal 13 of vehicle 12 merely by positioning itself on the opposite side of thermal layer 10 from the vehicle 12. Thus, a problem exists in the art whereby it is necessary to quickly and effectively determine the location of the thermal layer 10 in order to position the vehicle, as at 12', on that side 11' of the thermal layer 10 which will correspond to the target 14. The target 14 will then be detected as shown in the lower half of FIG. 1 by sonar signal 13'.

The current technique of presetting many underwater vehicles such as the Mk 46 torpedo requires the operator to select (preset) a depth that the vehicle will use to initially locate a submerged target. This initial preset search depth is chosen based on knowledge of three variables: (a) water depth, thermal layer depth, and (c) target depth.

The water depth provides a lower boundary below which the vehicle cannot pass. By using ocean charts and maps, the operator can identify the average local water depth to a reasonable degree of accuracy.

The thermal layer depth is a function of ocean currents, the ambient weather conditions, and time. Additionally, temperature/depth profiles are only accurate when and where the data is taken. Consequently, the locations of any thermal layers are only known approximately when they are known at all.

The depth at which the target is located is rarely known to any significant degree of precision unless it happens to be at the surface. If it were known, the operator would always select the vehicle's initial search depth to match the target depth since this would automatically place both vehicles on the same side of the layer.

Since the thermal layer depth and the target depth are generally not well known by the operator, the vehicle's initial search depth is usually preset with an educated guess. If the vehicle and target are on opposite sides of the thermal layer such as the situation occurring in FIG. 1, the mission may only succeed if the vehicle 32 and target 34 pass relatively close to each other since the successful acquisition range may be very short under these circumstances. To complicate the mission, a target 34 can evade the pursuing vehicle by changing depth to place itself on the opposite side of the thermal barrier 30.

The following patents, for example, disclose various types of depth sensors, but do not disclose a thermal detection system within a vehicle as does the present invention which permits a detection of underwater thermal boundary layers.

U.S. Pat. No. 3,802,365 to Reeser;
U.S. Pat. No. 3,882,808 to Francois et al.;
U.S. Pat. No. 4,239,012 to Kowalyshyn et al.;
U.S. Pat. No. 4,323,025 to Fisher et al.; and
U.S. Pat. No. 5,819,676 to Cwalina.

Specifically, Reeser disclose a depth responsive override system for correcting torpedo command signals directing the torpedo beyond a pre-selected depth, including a depth sensor and an adjustable depth signal source combined in a first differential amplifier to produce a difference signal indicative of the difference of the actual depth minus the pre-selected depth. A function generator is connected to receive the depth difference signal and the torpedo command signal for producing an override output signal during the times when the pitch command signal is greater than the difference signal. A second differential amplifier is connected to receive the pitch command signal and the function generator output signal for producing an output signal to control the torpedo elevators.

The patent to Francois et al. discloses a method of effecting control and guidance of an anti-submarine torpedo of the type having a high yield warhead. The torpedo is launched from a hunter submarine against a submerged target submarine. The torpedo warhead when exploded beneath the surface of the water has explosive properties such that the maximum distance at which a predetermined damage inflicting effect occurs increases in a predetermined manner in accordance with the depth at which the warhead is exploded. This method includes the steps of placing the hunter submarine at a torpedo launching depth and launching the torpedo. The hunter submarine is then maintained at the depth or above until the warhead is exploded. The torpedo is then guided outwardly from the hunter submarine along a first substantially horizontal course. The torpedo is next guided downwardly and outwardly through the safe-to-detonate volume along a second slant dive course at a fixed dive angle after the torpedo travels across said surface of revolution and into the safe-to-detonate volume. A third horizontal course is provided at a desired explosion depth. The warhead detonates at a desired distance from courses within said safe-to-detonate volume.

Kowalyshyn et al. discloses a homing torpedo control apparatus in an echo-ranging torpedo wherein spurious and tru-target echo signals may be received in the listening periods between repetitive search-pulse transmission instants, in combination: a receiver operative to convert received echo signals to steering command signals having characteristics corresponding to echo-source direction, said receiver including a target-recognition circuit and a gating relay which operates, with inherent delay, in response to recognition of each tru-target echo signal; a steering control circuit, including steering relay and a switch means, adapted to place said steering relay switch means in a condition corresponding to echo-source direction as derived by said steering control signals; means applying said steering command signals to said steering control circuit; means controlled by operation of said gating relay, in response to each reception and recognition of a tru-target echo signal, to render said steering control circuit operative to respond to steering command signals stemming from subsequent echo signals during a predetermined interval, of the order of a few listening periods, following each said reception and recognition of a tru-target echo signal, and a steering apparatus responsive, when rendered effective, to said steering relay and switch means condition; said gating relay, when operated controlling said steering apparatus to render it effective to respond to said steering relay and switch means condition.

Fisher et al. disclose a torpedo steering control system including means for providing a target search phase of torpedo operation wherein said torpedo is controlled to change depth between predetermined search floor and search ceiling depths and simultaneously controlled to circle in azimuth, whereby to execute helical search action; means for switching, in response to target acquisition at any time during a search phase of torpedo operation, to a target pursuit phase of torpedo operation; and means for switching, in the event of and in response to target loss continuing for a predetermined period in a target pursuit phase, to a modified search phase of torpedo operation wherein said torpedo is initially controlled to execute circle search action while maintaining depth position at substantially that at which target loss occurred, for a predetermined period accommodating at least a complete azimuth circling turn, then controlled to revert to helical search action.

Cwalina discloses a search angle selection system to determine acoustic homing beam offset angles to be used by a torpedo from a group of target depth conditions in response to given environmental, tactical, target and vehicle information. The system optimally bounds the region that is to be insonified. The system determines the search angle which best insonifies the depth band, that is, the region between the upper depth bound and the lower depth bound, for each search depth, accounting for the vehicle's attack angle, including search depths which are not in the depth band itself. For each search depth, the system determines the relative depth separation of the search depth from the each of the bounds, and based on this separation an aimpoint which projects from a reference plane through the torpedo is chosen at the depth of each bound. The aimpoint is selected from a table of empirically-determined values. The system modifies the aimpoint when strong negative gradients in the sound velocity profile are present in the ocean environment, and also in the case of strongly conducted rays. A reference insomnification beam axis angle is iteratively determined for reach search depth with the axis causing a raypoint which intersects along the respective bound. The pair of reference beam axes whose ray paths intersect the upper and lower bound at the aimpoint for each search depth are averaged to provide the optimal homing beam angle for that search depth.

In view of the prior art, the present inventors have discovered that if the vehicle can internally identify the thermal layer, it can then change depth and actually use the layer to its own advantage by focusing the sonar signals toward the target. It should be understood that the present invention would in fact enhance the functionality of the above patents by providing a thermal sensor within the vehicle of choice for sampling seawater and determining the presence of a thermal layer when encountered. Additionally, the system is such that the depth of the vehicle is alterable in response to the detection of the thermal layer, thus enhancing the ability of the vehicle to locate a subject target.

SUMMARY OF THE INVENTION

Therefore it is an object of this invention to provide an improved target searching capability for an underwater vehicle.

Another object of this invention is to provide a device capable of determining the presence of an underwater thermal layer.

Still another object of this invention is to provide a thermal sensor within a vehicle for determining the temperature of the water surrounding the vehicle.

A still further object of the invention is to provide a thermal sensor within a vehicle for determining the temperature of the water surrounding the vehicle and transmitting the collected data to a guidance and control portion of the vehicle.

Yet another object of this invention is to provide a vehicle enhanced with a thermal sensor and sensor electronics for determining and reporting the temperature of the seawater surrounding the vehicle, and further transmitting the data to a guidance and control portion of the vehicle for further directing maneuvers of the vehicle.

In accordance with one aspect of this invention, there is provided an underwater vehicle acoustic detection system for locating an underwater target. The detection system includes a thermal sensor system having an output indicating the current temperature of the environmental water. A depth sensor is provided having an output indicating the current depth of the environmental water. A sonar system having an input provides acoustic information from the surrounding environmental water, and a control system is joined to the depth sensor output, the thermal sensor output and the sonar system. The control system is capable of maneuvering the underwater vehicle in response to the received temperature, depth and acoustic information.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
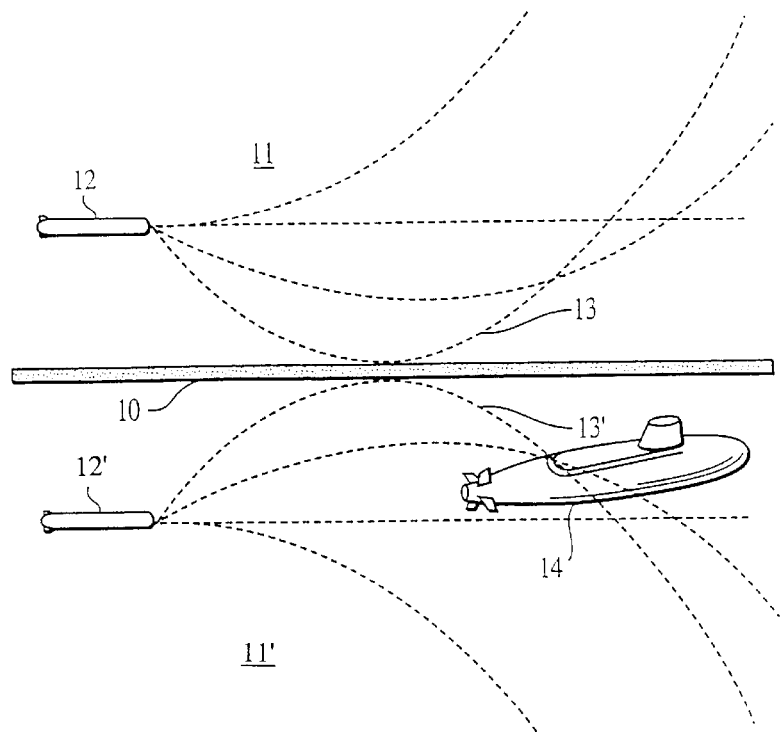
FIG. 1 is a side view of a target protected by a thermal layer as occurs in the known prior art and depicts the relationship of the vehicle to the target both above and below a thermal layer.

In general, the present invention is directed to a thermal detection system improving the ability of an underwater vehicle 12 to acquire a target 14 such as a submarine. It does this by identifying thermal layers 10 in the seawater. The thermal layers 10 can be used by targets 14 as acoustic barriers to avoid detection by sonar 13 of the vehicle 12. Once the locations of these thermal layers 10 are identified, the vehicle 12 is able to modify its search depth to search on both sides of a thermal layer 10 and eliminate the cloaking effect of the thermal layer 10.

Figure 2:
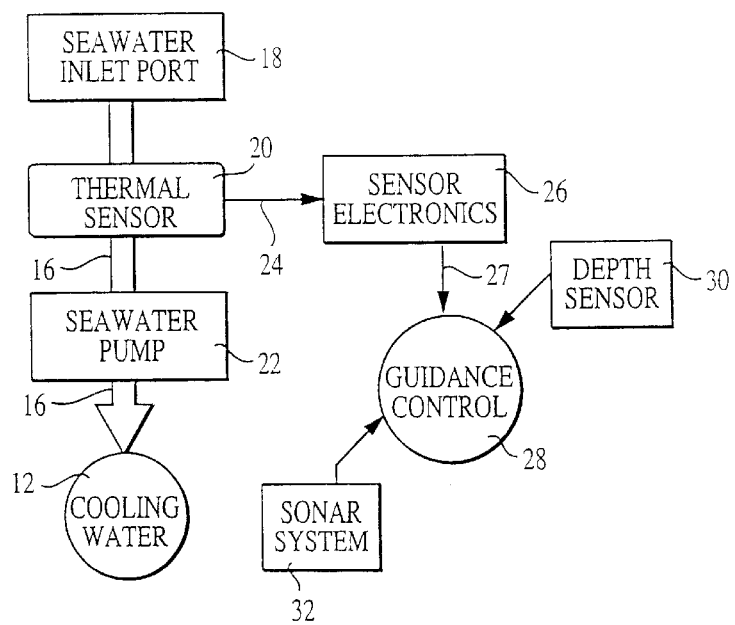
FIG. 2 is a schematic diagram of thermal sensor components according to the preferred embodiment of the present invention.

Referring now more specifically to the invention, FIG. 2 is a schematic diagram showing the overall arrangement of the invention components. Essentially, the thermal detection system includes a cooling water pipe 16 sequentially connected to a seawater inlet port 18, a thermal sensor 20, and a seawater pump 22. Sensor electronics 26 are provided in connection with the thermal sensor 20 for processing the detected temperature of seawater at the thermal sensor 20. Data passes from the thermal sensor 20 to the sensor electronics 26 via connection cables 24 or similar means.

The system utilizes additional components including a depth sensor 30 and a sonar system 32. The depth sensor 30 determines the current depth at which the vehicle 12 is operating and the sonar system 32 acts in the manner of a known sonar system to locate targets 14.

Compiled data from each of the sensor electronics 26, depth sensor 30 and sonar system 32 are forwarded to a guidance and control device 28 of the particular vehicle 12. The system may be installed in any number of vehicles, and is shown here for use with a vehicle such as a torpedo.

In operation, the cooling water from the ocean is drawn into the vehicle 12 at the appropriately positioned seawater inlet port 18 and into the cooling water pipe 16 where its temperature is sampled by the thermal sensor 20. The sensor electronics 26 condition the small electrical signals coming from the thermal sensor 20 so that they can be accurately sent to the guidance and control device 28 for processing. After the temperature is sensed, the seawater pump 22 causes the seawater to flow into the vehicle 12 through cooling water pipe 16 to remove heat from the engine and other vehicle components.

Figure 3:
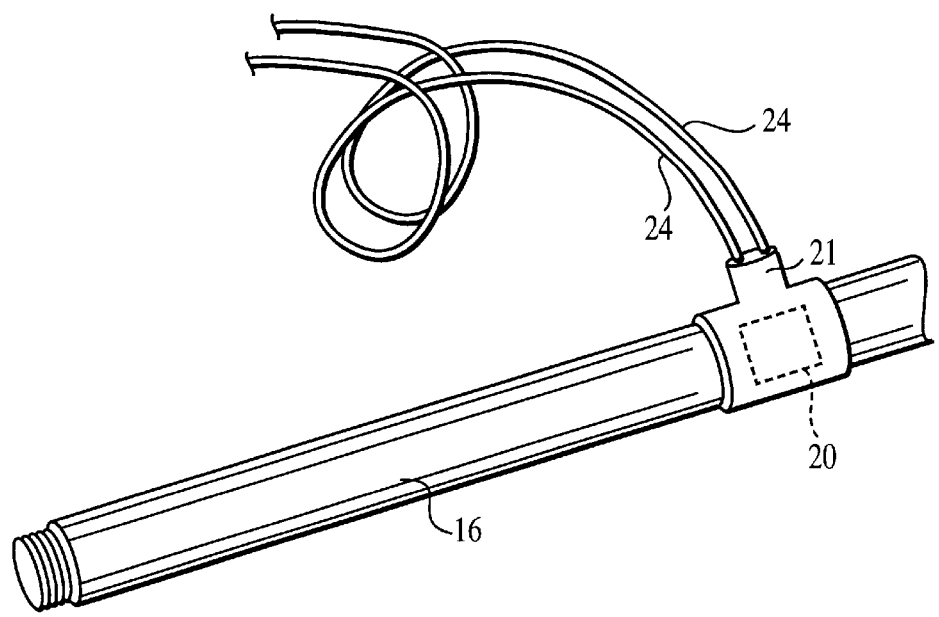
FIG. 3 is a perspective view of the thermal sensor of the present invention.

Referring now to FIG. 3, the thermal sensor 20 is positioned close to the seawater inlet port 18 to ensure that the temperature of the interior of the vehicle 12 does not affect the seawater temperature. The thermal sensor 20 is part of a fixture 21 installed into the cooling water pipe 16 and would have an appearance similar to that shown in FIG. 3. The fixture 21 positions the thermal sensor 20 in the center of the water flow, thereby ensuring that the temperature measured by the thermal sensor 20 accurately reflects that of the seawater outside the vehicle 12. The water flowing across the face of the thermal sensor 20 also reduces the time required for the sensor 20 to change its electrical output in response to a rapid temperature change. This allows the vehicle's guidance and control device 28 to respond accurately to the depth at which temperature changes take place even when the vehicle 12 is diving or climbing at high speeds.

Figure 4:
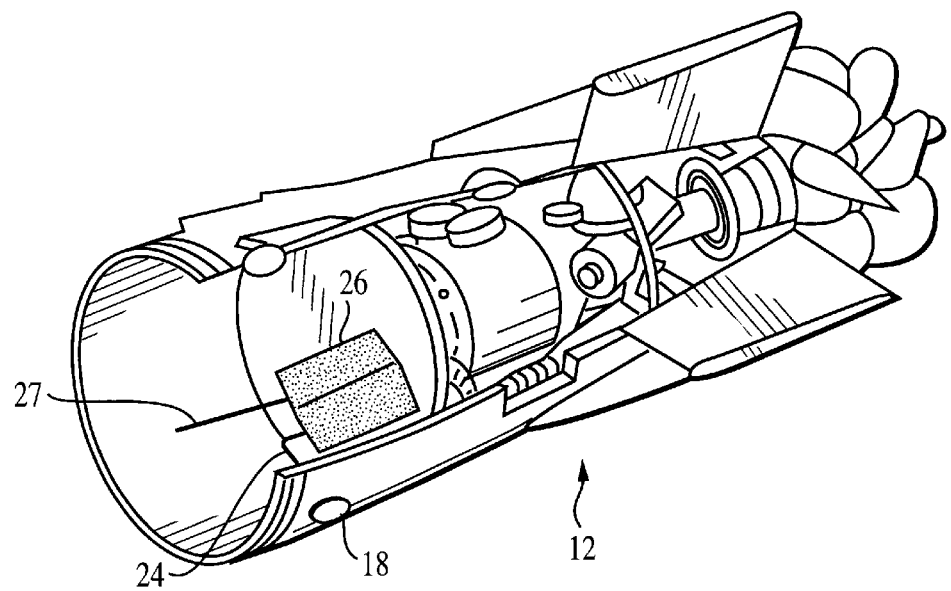
FIG. 4 is a perspective view of the preferred embodiment of the invention incorporated into a known vehicle.

Referring next to FIG. 4, there is illustrated a perspective view of the housing for the vehicle 12 of the inventive thermal sensor system. The thermal sensor and associated sensor electronics 26 continuously monitor the water temperature and pass this information to the vehicle's guidance and control system 28 via data line 27. The guidance and control system 28 uses the water temperature information and the vehicle depth to calculate and store the thermal layer locations as the vehicle travels through the water. With the vehicle autonomously determining the location of these boundaries, it will search first on one side of the boundary and then change to the other side if no target is found.

A vehicle with this invention will be able to quickly determine alternate search depths thereby avoiding the negative effects of acoustic boundaries. The result will be more rapid detection of targets and a greater chance for mission success.

Accordingly, the inventors have discovered a thermal detection system that is easily incorporated into existing vehicles with a minimal expenditure of funds and a minimal impact on existing hardware so that vehicle use problems will not be introduced.

In view of the above detailed description, it is anticipated that the invention herein will have far reaching applications other than those of underwater vehicles.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. An underwater vehicle acoustic detection system for locating an underwater target comprising:

a thermal sensor system having an output indicating the current temperature of surrounding environmental water;

a depth sensor having an output indicating the current depth of surrounding environmental water;

a sonar system having an output providing acoustic information from surrounding environmental water; and a control system joined to said depth sensor output, said thermal sensor output, and said sonar system output, said control system being capable of maneuvering said underwater vehicle in response to said received temperature, depth, and acoustic information;

wherein said thermal sensor system comprises:

a fluid transport means having an intake and output for passage of a fluid;

a thermal sensor disposed in said fluid transport means, said thermal sensor having an output providing a signal representative of an actual temperature of fluid within said fluid transport means; and sensor electronics joined to said thermal sensor output, said sensor electronics conditioning signals output by said thermal sensor;

said thermal sensor selectively sampling fluid passing through said fluid transport means.

2. The system according to claim 1 wherein selective sampling by said thermal sensor is continuous.

3. The system according to claim 1 wherein said fluid is seawater, said fluid transport means intake is a seawater inlet port and said fluid transport means output is a seawater pump.

4. The system according to claim 1 wherein said fluid transport means further comprises a cooling water pipe disposed between said intake and output.

5. The system of claim 1 wherein said control system compiles said received depths and said received temperatures and determines the depth of thermal boundary layers.

6. The system of claim 5 wherein said acoustic information indicates a selected one of target detection and target absence.

7. The system of claim 6 wherein said control system maneuvers said underwater vehicle to the other side of a determined boundary layer depth when said received acoustic information indicates target absence at the current depth.

8. An underwater vehicle comprising:

a water proof hull;

a thermal sensor system positioned in said hull and in communication with environmental water outside said hull having an output indicating the current temperature of the environmental water;

a depth sensor positioned in said hull and having an output indicating the current depth of the environmental water;

a sonar system positioned in said hull and having an output providing acoustic information from the environmental water;

a maneuvering means positioned on said hull; and a control system positioned in said hull and joined to said depth sensor output, said thermal sensor output, said sonar system, and said maneuvering means, said control system being capable of controlling said maneuvering means in response to said received temperature, depth, and acoustic information;

wherein said thermal sensor system comprises:

a fluid transport means having an intake and output for passage of a fluid;

a thermal sensor disposed in said fluid transport means, said thermal sensor having an output providing a signal representative of an actual temperature of fluid within said fluid transport means; and sensor electronics joined to said thermal sensor output, said sensor electronics conditioning signals output by said thermal sensor;

said thermal sensor selectively sampling fluid passing through said fluid transport means.

9. The system according to claim 8 wherein selective sampling by said thermal sensor is continuous.

10. The system according to claim 8 wherein said fluid is seawater, said fluid transport means intake is a seawater inlet port and said fluid transport means output is a seawater pump.

11. The system according to claim 8 wherein said fluid transport means further comprises a cooling water pipe disposed between said intake and output.

12. The system of claim 8 wherein said control system compiles said received depths and said received temperatures and determines the depth of thermal boundary layers.

13. The system of claim 12 wherein said acoustic information indicates a selected one of target detection and target absence.

14. The system of claim 13 wherein said control system maneuvers said underwater vehicle to the other side of a determined boundary layer depth when said received acoustic information indicates target absence at the current depth.

* * * * *